(12) United States Patent
Huber et al.

(10) Patent No.: US 7,576,146 B2
(45) Date of Patent: Aug. 18, 2009

(54) POLYMERIC COLORED DISPERSANTS AND COLORANT DISPERSIONS CONTAINING SAME

(75) Inventors: Gregory T. Huber, Indian Springs, OH (US); Tatiana N. Romanova, Loveland, OH (US); Russel J. Schwartz, Cincinnati, OH (US); Terence R. Chamberlain, Montgomery, OH (US)

(73) Assignee: Sun Chemical Corporation, Parsippany, NJ (US)

( * ) Notice: Subject to any disclaimer, the term of this patent is extended or adjusted under 35 U.S.C. 154(b) by 560 days.

(21) Appl. No.: 10/730,223

(22) Filed: Dec. 5, 2003

(65) Prior Publication Data

US 2005/0124727 A1 Jun. 9, 2005

(51) Int. Cl.
*C09D 11/00* (2006.01)
*C09D 11/10* (2006.01)
*C08J 3/02* (2006.01)

(52) U.S. Cl. .................. 523/160; 523/161; 523/200; 523/205; 524/579; 524/580; 524/582; 524/583; 524/584; 524/585; 524/586; 524/543; 524/570

(58) Field of Classification Search .......... 523/160, 523/161, 200, 205; 524/580, 579, 582, 583, 524/584, 585, 586, 543, 570
See application file for complete search history.

(56) References Cited

U.S. PATENT DOCUMENTS

| 3,996,059 | A |   | 12/1976 | Stansfield et al. |
|-----------|---|---|---------|-------------------|
| 4,014,844 | A | * | 3/1977  | Vidal et al. ................. 524/560 |
| 4,057,436 | A |   | 11/1977 | Davies et al. |
| 4,137,243 | A |   | 1/1979  | Farmer ........................ 260/378 |
| 4,141,684 | A |   | 2/1979  | Kuhn ............................. 8/39 R |
| 4,375,357 | A | * | 3/1983  | Wingard et al. ................. 8/647 |
| 4,468,255 | A |   | 8/1984  | Schwartz et al. ........ 106/288 Q |
| 4,859,247 | A |   | 8/1989  | Foye et al. |
| 5,100,471 | A |   | 3/1992  | Winnik et al. .................. 106/23 |
| 5,135,972 | A |   | 8/1992  | Kluger et al. .................. 524/88 |
| 5,177,200 | A |   | 1/1993  | Kluger et al. ............... 540/122 |
| 5,262,269 | A |   | 11/1993 | Nair et al. .................... 430/137 |
| 5,270,363 | A |   | 12/1993 | Kluger et al. .................. 524/90 |
| 5,419,800 | A |   | 5/1995  | Moody ........................ 156/502 |
| 5,569,407 | A |   | 10/1996 | Avery et al. |
| 5,766,268 | A |   | 6/1998  | Bruhnke ......................... 8/647 |
| 5,789,515 | A |   | 8/1998  | Bruhnke ....................... 528/12 |
| 6,022,944 | A |   | 2/2000  | Weaver et al. ............... 528/391 |
| 6,034,158 | A |   | 3/2000  | Hunt et al. ................... 524/275 |
| 6,106,597 | A |   | 8/2000  | Starks et al. ............. 106/31.08 |
| 6,187,085 | B1 |  | 2/2001  | Wasilewski ............... 106/31.75 |
| 6,287,348 | B1 |  | 9/2001  | Bruhnke ......................... 8/543 |
| 6,451,071 | B1 |  | 9/2002  | Bruhnke ......................... 8/543 |
| 6,452,020 | B1 |  | 9/2002  | Batlaw et al. ................ 549/225 |
| 6,486,248 | B2 |  | 11/2002 | Ashley et al. ............... 524/358 |
| 6,508,873 | B1 |  | 1/2003  | Shawcross et al. ........ 106/31.49 |
| 7,056,962 | B2 | * | 6/2006 | Johnson et al. ............. 523/205 |

FOREIGN PATENT DOCUMENTS

| GB | 1108261 A | * | 4/1968 |
| GB | 1424517   |   | 2/1976 |
| GB | 1424517 A | * | 2/1976 |

* cited by examiner

*Primary Examiner*—Sanza L McClendon
(74) *Attorney, Agent, or Firm*—Dickstein Shapiro LLP

(57) ABSTRACT

Polymeric colored dispersant having the structure $A\text{-}(B\text{---}X)_n$, where A is an organic chromophore; B is a covalently bonded linking moiety; X is a branched or linear $C_{50}\text{-}C_{200}$ polymeric covalently linked hydrocarbon, and n is an integer from 1 to 4, and low viscosity colorant dispersions containing same having a relative interfacial tension drop of less than about 1.5.

35 Claims, 1 Drawing Sheet

POLYMERIC COLORED DISPERSANTS AND COLORANT DISPERSIONS CONTAINING SAME

FIELD OF THE INVENTION

This invention relates to polymeric colored dispersants and colorant dispersions for use in formulating printing inks and other hydrocarbon systems.

BACKGROUND OF THE INVENTION

Polymeric colored materials generally exhibit a high degree of solubility and excellent colorability when employed in hydrocarbon compositions such as mineral oils, fuels and the like, and in wax compositions, such as candles, crayons and the like. However, colored polymers are not disclosed in the prior art as dispersing agents for use hydrocarbon compositions or printing inks. For example, U.S. Pat. No. 6,187,085 B1 describes a printing ink composition made of carbon black and an alkali metal hydroxide in combination with an alkenyl succinimide for dispersing the carbon black. It also discloses a method of dispersing carbon black in a mineral oil and metal salts, which exhibit poor lithographic printing performance. U.S. Pat. No. 6,508,873 B1 discloses phthalocyanine polymeric amides and esters with a polymeric tail of up to $C_{30}$ for use as colorants in ink-jet printing inks. U.S. Pat. Nos. 6,451,071 and 6,287,348 disclose colored materials of the structure A-B—X wherein A is an organic chromophore, B is an electrophilic linking group bonded to A, and X is selected from the group of $C_{12}$-$C_{24}$ primary or secondary amines. U.S. Pat. No. 6,486,248 B2 discloses a hydrocarbon soluble liquid polymeric colorant comprised of a chromophore and oleophilic binder and an alcohol including a carbon chain between $C_3$-$C_{30}$. U.S. Pat. No. 6,452,020 B1 discloses xanthene colorants that exhibit improved wax or oil solubility made with polyoxyalkylene polymers. U.S. Pat. No. 6,106,597 discloses a polymeric colorant with the formula R{A[(B)$_n$R$^1$]$_m$}$_x$ wherein R is an organic chromophore, A is a linking group, B is a $C_2$-$C_4$ alkyleneoxy constituent, n is an integer from 2-100, m is 1 when A is O, S, $CO_2$ or 2 when A is N or $SO_2$N, x is an integer from 1-5 and R$^1$ is a $C_8$-$C_{20}$ fatty acid. U.S. Pat. No. 6,034,158 discloses a colorant wax composition comprising a colorant of the formula R{A-[(alkyleneoxy constituent)nN}m}x wherein R is an organic chromophore, A is a linking group, B is a $C_2$-$C_4$ alkyleneoxy constituent, n is an integer from 2-100, m is 1 when A is O, S, $CO_2$ or 2 when A is N or $SO_2$N, x is an integer from 1-5 and a surfactant selected from the group consisting of a derivative of sorbitan monooleate. U.S. Pat. No. 6,022,944 discloses a polymeric colorant of the structure A[SO2N(R1)—(Y)]1-6 where A is an anthraquinone chromophoric radical, Y is a polymeric substituent having from 4-200 repeat groups and R1 is selected from H, Y, C1-12, or alkyl, aryl or cycloalkyl. U.S. Pat. No. 5,789,515 discloses a colorant with the structure ABXYZ in which A is an organic chromophore, B is an electrophilic reactive group covalently bonded to A, X is a nucleophilic linking group covalently bonded to B, Y is a poly(oxyalkylene)-polysiloxane copolymer, and Z is a terminal group for Y. U.S. Pat. No. 5,766,268 discloses a colorant compatible with polar solvent colorants with the structure ABXYZ in which A is an organic chromophore, B is an electrophilic reactive group covalently bonded to A, X is a nucleophilic linking group covalently bonded to B, Y is a poly(oxyalkylene) polymer, and Z is a terminal group for Y. U.S. Pat. No. 5,270,363 discloses a phthalocyanine colorant that contains polyoxyalkylene polymeric tails. U.S. Pat. No. 5,177,200 discloses a colorant of the formula A—($SO_2$—N(R$_2$)—Y$_n$ wherein A is a non-ionic metalophthalocyanine chromophore of Cu, Ni, or Al, R$_2$ is a hydrogen $C_1$-$C_6$ alkyl or cycloalkyl, phenyl, benzyl, or Y, Y is a poly(oxyalkylene) moiety comprising 3 units, and n is an integer between 1-4. U.S. Pat. Nos. 5,419,800 and 5,135,972 both disclose a phthalocyanine colorants that contain polyoxyalkylene polymeric tails. U.S. Pat. No. 4,141,684 discloses a colorant that is a chromophore covalently bonded to a polyalkylene oxides of a molecular weight of at least 500 amu. U.S. Pat. No. 4,137,243 discloses anthraquinone polymeric colorants that contain polyoxyalkylene polymeric tails. U.S. Pat. No. 5,100,471 discloses an aqueoU.S. ink jet composition comprised of a solvent and colored particles having a polymeric core and a silica shell onto which dyes are covalently bonded. U.S. Pat. No. 4,468,255 claims diazo and azo linkage Schiff's bases reacted with polyoxyalkane polymeric chains which can be used as a rheological modifier for pigment dispersions.

As indicated hereinabove, the prior art discloses polymeric colored materials that either have no more than $C_{24}$ a polyalkene chain or contain a polyoxyalkylene polymer. However these polymeric colored materials are not suitable for use as pigment dispersants in non-polar systems and would not decrease the viscosity of a pigment dispersion when employed in a relatively small amount (i.e., 1-15% w/w pigment).

Thus there exists a need for a dispersant which lowers the viscosity of a pigment dispersion yet permits a higher pigment loading resulting in highly pigmented concentrations capable of being satisfactorily handled and dispersed in lithographic printing inks. Moreover, there exists a need to improve the stability of pigment dispersions used to pigment hydrocarbon compositions. There also exists a need for a dispersant that lowers the viscosity of highly concentrated non-polar pigment dispersions. At a high pigment load offering good lithographic and gravure printing performance while reducing the tendency towards scumming, feedback and over-emulsification.

SUMMARY OF THE INVENTION

It has now been found that the above objectives can be realized by a polymeric colored dispersant having the structure A-(B—X)$_n$, wherein: A is an organic chromophore; B is a covalently bonded linking moiety; X is a branched or linear $C_{50}$-$C_{200}$ polymeric hydrocarbon; and n is an integer from 1 to 4.

The present invention is also an improved color strength colorant dispersion comprising a polymeric colored dispersant having the structure A-(B—X)$_n$, wherein A, B, X, and n are as described above.

The present invention is also a colorant dispersion of at least about 45 wt. % colorant, based on the total weight of the dispersion, containing a polymeric colored dispersant of the structure A-(B—X)$_n$, wherein A, B, X, and n are as described above.

The present invention also provides a colorant dispersion of at least 45 wt. % colorant and a dispersant, having a viscosity less than about 150 Pa·s.

The present invention also provides a method of lowering the viscosity of a colorant dispersion to less than about 150 Pa·s., said dispersion containing a colorant and a polymeric colored dispersant, wherein said dispersant has the structure A-(B—X)$_n$, wherein A, B, X, and n are as described above.

The present invention further provides a printing ink composition having a colorant dispersion containing a polymeric colored dispersant of the structure A-(B—X)$_n$, wherein A, B, X, and n are as described above.

Other objects and advantages of the present invention will become apparent from the following description and appended claims.

DETAILED DESCRIPTION OF THE INVENTION

Figure 1:
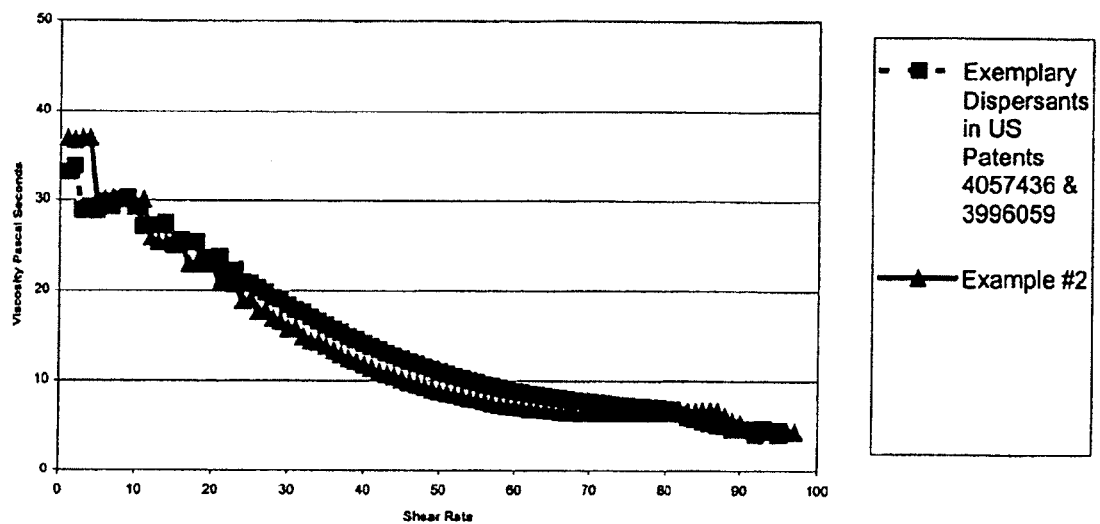
FIG. 1 is a graph comparing Example 2 with the prior art.

The present invention is a polymeric colored dispersant of the structure A-(B—X)$_n$, where A is an organic chromophore; B is a covalently bonded linking moiety between A and X; X is a branched or linear $C_{50}$-$C_{200}$ polymeric hydrocarbon, and n is an integer from 1 to 4.

As for the organic chromophore (A), suitable organic chromophores include, but are not limited to, mono and diazo pigments, phthalocyanine pigments, quinacridone pigments, rhodamine dyes and pigments, perylene pigments, diketoprryoles pigments, anthraquinone dyes and pigments, indanthrene dyes, lake pigments, dioxazine pigments, isoindolinone pigments, and dioxazine pigments. It is preferred that the organic chromophore be red, yellow, violet or blue organic pigments or dyes, selected from but not limited to Carbon Black, Pigment Yellow 12, Pigment Yellow 13, Pigment Yellow 14, Pigment Yellow 74, Pigment Yellow 150, Pigment Orange 5, Pigment Orange 13, Pigment Orange 16, Pigment Orange 64, Pigment Red 2, Pigment Red 81:2, Pigment Red 122, Pigment Red 144, Pigment Red 166, Pigment Red 179, Pigment Red 184, Pigment Red 202, Pigment Red 254, Pigment Red 264, Pigment Violet 1, Pigment Violet 2, Pigment Violet 3, Pigment Violet 19, Pigment Violet 23, Pigment Blue 15:3, and Blue 15:4.

As for the linking moiety (B), suitable linking moieties are selected from but not limited to, moieties that contain the elements O, N, or S. It is preferred that the linking moiety contains an amino group.

As for polymeric covalently linked hydrocarbons (X), suitable polymeric covalently linked hydrocarbons are selected from but not limited to either branched or linear hydrocarbons. The polymeric hydrocarbon may be a $C_{50}$-$C_{200}$ hydrocarbon, preferably a $C_{100}$-$C_{150}$ hydrocarbon. The polymeric hydrocarbon may, for example, be a polyalkylene and more preferred is polyisobutylene.

The n value may be from 1 to 4, preferably either 1 or 2.

Preferably, the polymeric colored dispersant of the present invention has a viscosity of less than about 150 Pa·s.

The dispersant is to be contained in a colorant dispersion which may further contain between about 45 wt. % to about 90 wt. %, based on the total weight of the colorant dispersion, of a colorant which is an organic pigment, carbon black or dye. It is preferred that the colorant be present from about 45 wt. % to about 65 wt. %. Suitable organic pigments and dyes for colorant include, but are not limited to mono and diazo pigments, phthalocyanine pigments, quinacridone pigments, rhodamine dyes and pigments, perylene pigments, diketoprryoles pigments, anthraquinone dyes and pigments, indanthrene dyes, lake pigments, dioxazine pigments, isoindolinone pigments, and dioxazine pigments. It is preferred that the colorant be selected from carbon black or a red, yellow, violet or blue organic pigments, including but not limited to Pigment Yellow 12, Pigment yellow 13, Pigment Yellow 14, Pigment Yellow 74, Pigment Yellow 150, Pigment Orange 5, Pigment Orange 13, Pigment Orange 16, Pigment Orange 64, Pigment Red 2, Pigment Red 81:2, Pigment Red 122, Pigment Red 144, Pigment Red 166, Pigment Red 179, Pigment Red 184, Pigment Red 202, Pigment Red 254, Pigment Red 264, Pigment Violet 1, Pigment Violet 2, Pigment Violet 3, Pigment Violet 19, Pigment Violet 23, Pigment Blue 15:3, and Pigment Blue 15:4.

The dispersant of the present invention significantly reduces viscosity of highly pigmented dispersions when employed in relatively small amounts. For example, the dispersant is effective when used in amounts of about 1 wt. % to about 15 wt. % based on the weight of the colorant, and more preferably about 10 wt. %.

The polymeric colored dispersant and colorant dispersions containing same of the present invention are particularly suitable for preparing high performance lithographic and/or gravure printing inks. The polymeric colored dispersant of the present invention is also useful for formulating hydrocarbon compositions, such as mineral oils, fuels, wax compositions, including candles, crayons, and the like.

There are a number of advantages in using the polymeric colored dispersant of the present invention for formulating hydrocarbon composition or waxes, including, but not limited to, significantly decreasing the viscosity of colorant dispersion incorporationg such dispersant when employed in relatively small amounts and lowering the viscosity of the colorant dispersions. This permits the inclusion of more colorant and results in highly colored concentrations that can be satisfactorily handled and dispersed in lithographic printing inks, for example. The polymeric colored dispersant of the present invention also improves the stability of a dispersion and increases the color strength of the colored dispersion due to its colored nature and increases the stability of the dispersion at the higher colorant loading.

The colored polymeric dispersant of the present invention has a minimal effect on the oil-water (O/W) interfacial tension of highly colored dispersions or concentrates. This preserves the lithographic quality (none or reduced scumming, feedback and over-emulsification) of the neat colorant concentrate and affords a low-relative O/W interface tension. Use of the colored polymeric dispersant of the present invention helps to avoid known lithographic problems such as over-emulsification which is when excessive fountain solution emulsification causes poor ink transfer, blanket piling, high dot gain, and misting. It also helps avoid scumming which is a condition where small amounts of ink are transferred onto the substrate from the non-image area of the plate. Scumming results from the inability of fountain solution to keep the non-image area of the printing plate ink-free or when ink floats on or is emulsified into the fountain solution (i.e. dampening system feedback). If not corrected by the press operators, scumming can result in rejection of the final printed product.

The polymeric colored dispersant and colorant dispersions of the present invention are further illustrated by the following non-limiting examples in which all parts and percentages are by weight, unless otherwise indicated.

EXAMPLE 1

Polyisobutylamine (200 grams; FD-100, available from BASF, Wyandotte, Mich.) from which the oil had been removed, was added to 2-chlorotoluene (200 grams; available from Aldrich Chemical Co. of Milwaukee, Wis.), and to Pigment Yellow 12 (26.5 grams; available from Sun Chemical Corp., of Ft. Lee, N.J.) under a nitrogen purge and heated at reflux for 24 hours producing a dark red solution. After the 2-chlorotoluene was removed, the reaction mixture was slowly cooled to room temperature, producing a very dark red viscous liquid.

EXAMPLE 2

2-(4-carboxyphenylazo) acetoacetanilide (43 grams) and 2-chlorotoluene (238 grams) were added under stirring and nitrogen purge. After purging with nitrogen for 10 minutes, hionyl chloride (20 grams) and dimethylformamide (1.5 grams) were added. The reaction mixture was heated to 90° C. over 3 hours and then maintained at this temperature for one additional hour. Polyisobutylamine (385 grams; FD-100, available from BASF, Wyandotte, Mich.) was added and a vacuum applied to the mixture while stirring at 90° C. for 3 hours. At this stage the mixture temperature was raised to 120° C. and maintained for an additional 5 hours. On subsequent cooling to room temperature, the reaction product obtained was a viscous yellow liquid.

EXAMPLE 3

Copper phthalocyanine sulfonyl chloride (100 grams; 38.24% in water) and polyisobutylamine (113 grams; FD-100, available from BASF, Wyandotte, Mich.) were thoroughly mixed for 10 minutes. Sodium carbonate (15 grams) was added to the stirring mixture. After 3 hours of mixing, a vacuum was applied at 90-120° C. for a period of 3 hours to remove reaction water. On subsequent cooling, the reaction product obtained was a very viscous blue liquid.

EXAMPLE 4

Rhodamine B (10 grams) and o-chlorotoluene (100 grams; both available from the Aldrich Chemical Co., Milwaukee Wis.), were mixed under a nitrogen purge and warmed to 35° C. Thionyl chloride (3.1 grams) was added to the reaction mixture and the mixture was slowly warmed to 50° C. for 1 hour, then warmed further to 100° C. for an additional hour. The reaction mixture was cooled to 50° C. and polyisobutylamine (29.75 grams; FD-100, available from BASF, Wyandotte, Mich.) was added and the entire reaction mixture was allowed to react for 3 hours. The reaction mixture was then heated under vacuum to 140° C. to remove both oil, from the polyisobutylamine, and the o-chlorotoluene, then slowly cooled to room temperature, to produce a very bright red viscous liquid.

EXAMPLE 5

3-Hydroxy-4-(2,5-dichlorophenylazo)naphthalene-2-carboxylic acid (48 grams; available from Anza Chemicals of Mumbai, India) and 2-chlorotoluene (238 grams) were mixed under a nitrogen purge. After a 10 minute purge with nitrogen, dimethylformamide (1.5 grams) and thionyl chloride (20 grams; both available from Aldrich Chemical Co. of Milwaukee, Wis.) were added to the mixture. The reaction mixture was heated to 90° C. during 3 hours and then the reaction product was maintained at this temperature for one additional hour. Polyisobutylamine (385 grams; FD-100, available from BASF, Wyandotte, Mich.) was added and a vacuum applied while stirring at 90° C. for 3 hours. The reaction mixture was heated to 120° C. and maintained for an additional 5 hours.

On subsequent cooling to room temperature, the reaction product was a viscous dark red liquid.

EXAMPLE 6

Polyisobutylamine (200 parts; FD-100, available from BASF, Wyandotte, Mich.) was mixed under nitrogen purge with 3,4,9,10-Perylene tetracarboxycilic acid dianhydride (3.5 parts; available from Aldrich Chemical Co., Milwaukee Wis.) and heated to 220° C. Over the next 8 hours a total of 10 additional grams of the 3,4,9,10-perylene tetracarboxycilic acid dianhydride was added to the stirring reaction and then allowed to react for an additional 11 hours. The reaction mixture was cooled to 25° C. and heptane (213.5 grams) was added and allowed to stir for half an hour. The reaction mixture was filtered and the heptane was then removed, producing a viscous red liquid.

EXAMPLE 7

A solution (48% in isopropyl alcohol) of polyisobutylene amide of 4-aminobenzoic acid (88 grams), dimethyl-succinyl succinate (4 grams), and HCl (37% solution; 0.07 grams) was mixed under nitrogen purge. The reaction mixture was heated to 120° C. over 1 hour with an applied vacuum to remove the isopropyl alcohol and a viscous orange liquid formed. The vacuum was discontinued and, after purging with nitrogen for 10 minutes, the reaction mixture was heated to 200° C. for 1½ hrs. On subsequent cooling to room temperature, the reaction product obtained was a viscous orange-red liquid.

EXAMPLE 8

Seven different pigment dispersion compositions containing different types of pigments and dispersants were prepared and their rheological properties were tested. Each pigment dispersion composition was prepared in the following manner: 25 parts of a varnish (16.75 parts of a hydrocarbon resin (LX 1082-280; available from Neville Chemical of Pittsburgh, Pa.) and 8.25 parts of 47 oil (available from Magie Bros., Franklin Park, Ill.)), 20 parts of 47 Oil (available from Magie Bros., Franklin Park, Ill.), 50 parts of pigment, and 5 parts dispersant (if present) were combined together and mixed on a Hoover Muller Mixer at 3×50 revolutions. The viscosities of the resulting pigment dispersions were measured along with their effect on the relative interfacial tension of an oil-water ink system.

Viscosity Measurements

Rheological measurements were carried out using the following instruments and under the following conditions:

Rheometer: Haake RS100 controlled stress rheometer with cone and plate geometry.

Measuring Geometry: Haake PP35H, parallel plate with a diameter of 35 mm. Temperature Control: Haake TC-501 electrical heater with temperature control to both cone and plate. Measurement mode: linear sweep from $10^{-1}$ to $100\ S^{-1}$ in 600 S. Measurement temperature: 25° C. (both cone and plate temperatures are controlled).

Each pigment concentrate sample in the form of a paste was loaded on a lower stationary plate with a spatula. All samples were of virgin materials and no preshearing was carried out on the sample to emulate the actual bulking process. The lower stationary plate was then raised slowly to compress the sample against an upper plate (the cone) to reach a measurement position. The gap width was set to be 1 mm in all cases. Both upper and lower plates were pre-equilibrated to 25° C. before starting the measurement. The sample was subjected to a linear stress sweep at a shear rate ranging from 10 to 100 $S^{-1}$. For a more viscous sample, the experiment was terminated before reaching 100 $S^{-1}$ to avoid torque overloading of the machine. The data collection mode was logarithmic to emphasize the lower shear rate range. Both shear stress and shear rate data were collected to obtain viscosity information on the sample. Each pigment dispersion was run 2-3 times and an average viscosity was calculated.

Interfacial Tension Measurements

A glass jar (2 ounces) used to prepare the sample dispersion was tared on a balance and 50 grams of stainless steel shot was added. The balance was again tared and Magiesol (32.3 grams, available from Magie Bros., Franklin Park, Ill.) was added with the sample concentrate (1 gram). The jar was placed on a Harbil shaker for 15 minutes to disperse the sample concentrate in the oil. The shot was strained from the dispersion. The shaker was calibrated with a ball bearing of known size. A cuvette and syringe used during the measurement of the interfacial tension was cleaned with an industrial detergent followed by washing with copious amounts of de-ionized water and finally placed in an ultrasonic bath cleaner in the presence of de-ionized water. The sample was analyzed for interfacial tension versus a citric acid buffer continuous phase at pH=3.1 for 600 seconds.

The relative interfacial tension drop (RIFTD) was calculated from the following equation:

$$\text{RIFTD} = \frac{\gamma_i - \gamma_f}{\gamma_f}$$

where $\gamma_i$ and $\gamma_f$ represent the initial and final interfacial tension respectively of the sample.

Measurement Results

Figure 2:
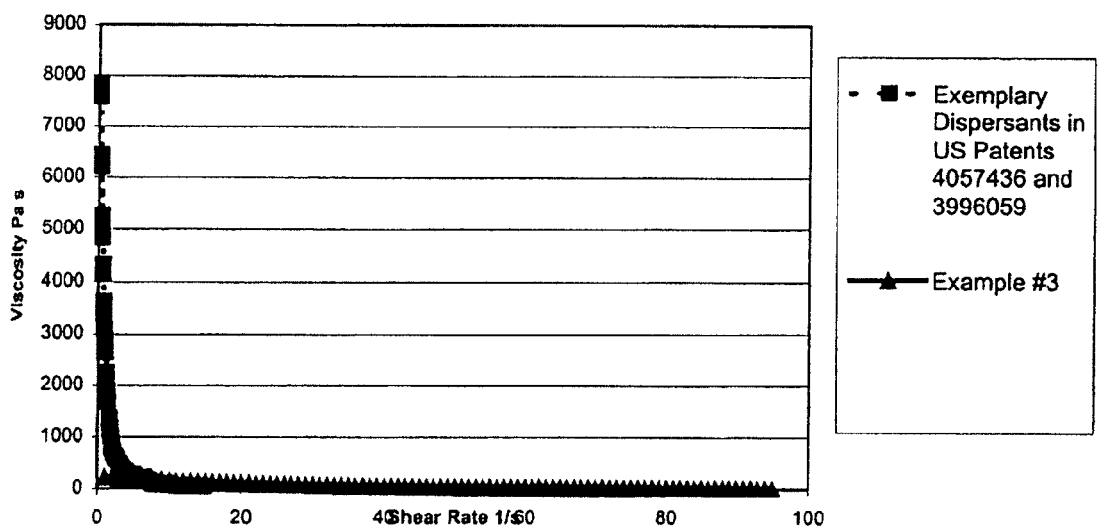
FIG. 2 is a graph comparing Example 3 with the prior art.

Table 1 and FIGS. 1 and 2 show the results of the rheological testing and interfacial tension measurements in numerical and graphical display. The results indicate that the pigment dispersion compositions containing the dispersants of the present invention have significantly lower relative interfacial tension drop than pigment dispersion compositions containing no dispersant or dispersants known in the prior art. Further, the pigment dispersion composition containing the present invention dispersant has lower viscosity than that of either the pigment dispersion containing no dispersant, or dispersants known in the prior art.

TABLE 1

|  | Pigment Type | Wt. % | Varnish Wt. % | Synergist wt. % | Dispersant wt. % | Oil wt. % | RIFTD | Average Pa·s @ 1/s |
|---|---|---|---|---|---|---|---|---|
| None | Yellow 12 | 50 | 25 | 0 | 0 | 25 | 0.41 | >8000 |
| Comparative Example (U.S. Pat. No. 4057436 & 3996059) | Yellow 12 | 50 | 25 | 2.5[1] | 2.5[3] | 20 | 1.93 | 23 |
| Example 1 | Yellow 12 | 50 | 25 | 0 | 5 | 20 | 0.41 | 33 |
| Example 2 | Yellow 12 | 50 | 25 | 0 | 5 | 20 | 1.18 | 23 |
| None | Blue 15:3 | 50 | 25 | 0 | 0 | 25 | 0.24 | >8000 |
| Comparative Example (U.S. Pat. No. 4057436 & 3996059) | Blue 15:3 | 50 | 25 | 2.5[2] | 2.5[3] | 20 | 0.73 | 2816 |
| Example 3 | Blue 15:3 | 50 | 25 | 0 | 5 | 20 | 0.18 | 104 |

[1] Solsperse 22000, available from Avecia of Charlotte, NC.
[2] Solsperse 500, available from Avecia of Charlotte, NC.
[3] Solsperse 17000, available from Avecia of Charlotte, NC.

The invention has been described in terms of preferred embodiments thereof, but is more broadly applicable as will be understood by those skilled in the art. The scope of the invention is only limited by the following claims.

What is claimed is:

1. A polymeric colored dispersant comprising the structure A-(B—X)$_n$, wherein: A is an organic chromophore; B is a covalently bonded linking moiety containing N and at least one of S and O; X is a branched or linear $C_{50}$-$C_{200}$ polymeric covalently linked hydrocarbon; and n is an integer from 1 to 4.

2. The dispersant of claim 1, wherein A is selected from the group consisting of organic pigments, dyes and carbon black.

3. The dispersant of claim 1, wherein B is a moiety contains S.

4. The dispersant of claim 1, wherein the hydrocarbon is a branched or linear $C_{50}$ to $C_{150}$ hydrocarbon.

5. The dispersant of claim 1, wherein n is selected from 1 and 2.

6. A colorant dispersion comprising a polymeric colored dispersant having the structure A-(B—X)$_n$, wherein: A is an organic chromophore; B is a covalently bonded linking moiety containing N and at least one of S and O; X is a branched or linear $C_{50}$-$C_{200}$ polymeric covalently linked hydrocarbon; and n is an integer from 1 to 4.

7. The dispersion of claim 6, wherein A is selected from the group consisting of organic pigments, dyes and carbon black.

8. The dispersion of claim 6, wherein B is a moiety contains S.

9. The dispersion of claim 6, wherein X is a branched or linear $C_{50}$ to $C_{150}$ polymeric covalently linked hydrocarbon.

10. The dispersion of claim 6, wherein n is selected from the group consisting of 1 and 2.

11. A colorant dispersion comprising: (a) at least about 45 wt. % of a colorant, based on the total weight of the dispersion, and (b) a polymeric colored dispersant having the structure A-(B—X)$_n$, wherein: A is an organic chromophore; B is a covalently bonded linking moiety containing N and at least one of S and O; X is a branched or linear C$_{50}$-C$_{200}$ polymeric covalently linked hydrocarbon; and n is an integer from 1 to 4.

12. The dispersion of claim 11 having a viscosity of less than about 150 Pa·s.

13. The dispersion of claim 11 having about 65 wt. % of said colorant, based on the total weight of the dispersion.

14. The dispersion of claim 11, wherein the colorant is selected from the group consisting of organic pigments, dyes and carbon black.

15. The dispersion of claim 14, wherein the colorant is an organic pigment.

16. The dispersion of claim 15, wherein the organic pigment is selected from the group consisting of mono and diazo pigments, quinacridone pigments, rhodamine dyes and pigments, perylene pigments, diketoprryoles pigments, carbon black, anthraquinone dyes and pigments, indanthrene dyes, lake pigments, dioxazine pigments, isoindolinone pigments, and dioxazine pigments.

17. The dispersion of claim 15, wherein the organic pigment is selected from the group consisting of Pigment Yellow 12, Pigment Yellow 13, Pigment Yellow 14, Pigment Yellow 74, Pigment Yellow 150, Pigment Orange 5, Pigment Orange 13, Pigment Orange 16, Pigment Orange 64, Pigment Red 2, Pigment Red 81:2, Pigment Red 122, Pigment Red 144, Pigment Red 166, Pigment Red 179, Pigment Red 184, Pigment Red 202, Pigment Red 254, Pigment Red 264, Pigment Violet 1, Pigment Violet 2, Pigment Violet 3, Pigment Violet 19, Pigment Violet 23, Pigment Blue 15:3, and Blue 15:4.

18. The dispersion of claim 11, wherein the dispersant is present in about 1 wt. % to about 15 wt. % based on the weight of the colorant.

19. The dispersion of claim 18, wherein said colorant is pigment and said dispersant is present in about 10 wt. % based on the weight of the pigment.

20. The dispersion of claim 11, wherein A is selected from the group consisting of organic pigments, dyes and carbon black.

21. The dispersion of claim 11 wherein B is a moiety contains S.

22. The dispersion of claim 11, wherein X is a branched or linear C$_{50}$ to C$_{150}$ polymeric covalently linked hydrocarbon.

23. The dispersion of claim 11, wherein n is selected from the group consisting of 1 and 2.

24. A printing ink composition comprising a colorant dispersion composition containing a polymeric colored dispersant having the structure A-(B—X)$_n$, wherein: A is an organic chromophore; B is a covalently bonded linking moiety containing N and at least one of S and O; X is a branched or linear C$_{50}$-C$_{200}$ polymeric covalently linked hydrocarbon; and n is an integer from 1 to 4.

25. The ink composition of claim 24, wherein the printing ink is a lithographic printing ink.

26. The ink composition of claim 24, wherein the printing ink is a gravure printing ink.

27. The ink composition of claim 24, wherein A is selected from the group consisting of organic pigments, dyes and carbon black.

28. The ink composition of claim 24, wherein B is a moiety contains S.

29. The ink composition of claim 24, wherein X is a branched or linear C$_{50}$ to C$_{150}$ polymeric covalently linked hydrocarbon.

30. The ink composition of claim 24, wherein n is selected from 1 and 2.

31. The ink composition of claim 27, wherein the printing ink is a lithographic or gravure printing ink, A is selected from the group consisting of organic pigments, dyes and carbon black, X is a branched or linear C$_{50}$ to C$_{150}$ polymeric covalently linked hydrocarbon and n is selected from 1 and 2.

32. The ink composition of claim 24, wherein B contains O.

33. The dispersion of claim 11, wherein B contains O.

34. The colorant dispersion of claim 6, wherein B contains O.

35. The polymeric colored dispersant of claim 1, wherein B contains O.

* * * * *

UNITED STATES PATENT AND TRADEMARK OFFICE
CERTIFICATE OF CORRECTION

PATENT NO.      : 7,576,146 B2                                      Page 1 of 1
APPLICATION NO. : 10/730223
DATED           : August 18, 2009
INVENTOR(S)     : Huber et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 789 days.

Signed and Sealed this

Seventh Day of September, 2010

David J. Kappos
*Director of the United States Patent and Trademark Office*